US011625250B2

(12) United States Patent
Eltantawy et al.

(10) Patent No.: US 11,625,250 B2
(45) Date of Patent: Apr. 11, 2023

(54) METHOD AND SYSTEM FOR PARALLEL PROCESSING OF TASKS IN MULTIPLE THREAD COMPUTING

(71) Applicant: HUAWEI TECHNOLOGIES CO., LTD., Guangdong (CN)

(72) Inventors: Ahmed Mohammed ElShafiey Mohammed Eltantawy, Woodbridge (CA); Yan Luo, Markham (CA); Tyler Bryce Nowicki, Mississauga (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 20 days.

(21) Appl. No.: 17/162,600

(22) Filed: Jan. 29, 2021

(65) Prior Publication Data

US 2022/0244962 A1  Aug. 4, 2022

(51) Int. Cl.
*G06F 9/38* (2018.01)
*G06T 15/06* (2011.01)
*G06F 9/30* (2018.01)

(52) U.S. Cl.
CPC ........ *G06F 9/3836* (2013.01); *G06F 9/30087* (2013.01); *G06T 15/06* (2013.01)

(58) Field of Classification Search
CPC .................................................. G06F 9/3836
See application file for complete search history.

(56) References Cited

U.S. PATENT DOCUMENTS

| | | | |
|---|---|---|---|
| 2014/0168238 A1 | 6/2014 | Luebke et al. | |
| 2014/0223420 A1* | 8/2014 | Kudlur | G06F 8/456 717/156 |
| 2016/0019066 A1 | 1/2016 | Diamos et al. | |
| 2016/0371067 A1* | 12/2016 | Absar | G06F 8/52 |
| 2019/0057539 A1* | 2/2019 | Stanard | G06T 17/005 |
| 2020/0043218 A1 | 2/2020 | Vaidyanathan et al. | |
| 2020/0081748 A1* | 3/2020 | Johnson | G06F 9/3887 |

OTHER PUBLICATIONS

Damani et al., "Speculative Reconvergence for Improved SIMT Efficiency", CGO '20, Feb. 22-26, 2020, San Diego, CA, USA.
Filing Receipt issued from the USPTO on Sep. 16, 2020 in connection with the U.S. Appl. No. 17/008,437.
Filing Receipt issued from the USPTO on Sep. 17, 2020 in connection with the U.S. Appl. No. 17/012,203.
International Search Report and Written Opinion of PCT/CN2021/135269; Song, Chao; dated Mar. 2, 2022.

\* cited by examiner

*Primary Examiner* — Michael J Metzger
(74) *Attorney, Agent, or Firm* — BCF LLP

(57) ABSTRACT

The disclosed systems, structures, and methods are directed to parallel processing of tasks in a multiple thread computing system. Execution of an instruction sequence of a thread allocated to a first task proceeds until an exit point of the instruction sequence is reached. The execution of the instruction sequence of the thread for the first task is terminated at a convergence point of the instruction sequence. The thread is selectively reallocated to process a second task.

18 Claims, 12 Drawing Sheets

METHOD AND SYSTEM FOR PARALLEL PROCESSING OF TASKS IN MULTIPLE THREAD COMPUTING

CROSS-REFERENCE TO RELATED APPLICATIONS

This is the first application filed for the instantly disclosed technology.

TECHNICAL FIELD

The present disclosure generally relates to the field of graphical processing and, in particular, to a method and a system for parallel processing of tasks in multiple thread computing.

BACKGROUND

Image processing is one of several fields of endeavor that require very high processing levels. Parallel processing is frequently used to process images within performance requirements, for example in real-time. In particular, ray-tracing is a technique used for rendering a two-dimensional (2D) image by simulating the path traveled by a virtual ray of light from a virtual camera (corresponding to the viewpoint of the 2D image), through a pixel of a 2D viewing plane, into a three-dimensional (3D) virtual scene. Each virtual ray is traced to determine whether the ray intersects with one or more surfaces of objects, sometimes called shaders' in image processing literature, in the 3D virtual scene. Depending on whether the ray hits or misses an object, a visual effect is rendered. Each virtual ray is simulated to behave like an actual ray of light, with reflections, refractions and shadows.

Ray-tracing can create realistic rendered images; however their computational cost can be high. The computational resources (e.g., computing time, memory resources, etc.) required to render an image using ray-tracing, especially for a scene having many objects, can limit the practical applications of ray-tracing. Parallel processing is used to meet the challenges places by these requirements. Examples of techniques for rendering images using tray-tracing are found in U.S. patent application Ser. No. 17/008,437, entitled "METHODS AND APPARATUSES FOR COALESCING FUNCTION CALLS FOR RAY-TRACING", filed on 31 Aug. 2020, the disclosure of which is incorporated by reference herein in its entirety.

Some graphical processing units (GPU) use a single instruction multiple thread (SIMT) execution model to perform a number of operations in parallel on multiple data, where single instruction multiple data (SIMD) is combined with multithreading. A single instruction sequence is applied by the GPU on a number of threads. A SIMT (i.e. a group of threads) is sometimes called a 'warp'. Generally speaking, the GPU will execute these instructions in 'lock-step' mode, meaning that all threads are required to follow all available paths in order to maintain parallelism and synchronicity. As an example, if the instructions in the threads include an 'IF-THEN-ELSE' set of instructions, some threads will follow an 'IF-THEN' path while others will follow an 'ELSE' path. Forcing the GPU to follow these two paths at all times leads to inefficient utilization of its processing capabilities.

For example, in a ray-tracing application in which multiple threads are allocated to multiple rays being treating by the imaging application, processing of some rays may terminate early and capabilities of the GPU to process these rays may be wasted. FIG. 1 (Prior Art) illustrates a ray-tracing scenario in which some rays from an origin miss a number of reflectors and stop being processed. Eight primary rays 12 are represent an original image 10, for example an object intended to be treated in a multiple thread of an imaging application implemented in a GPU (not shown). In the example of FIG. 1, the GPU may implement eight threads for concurrently processing the eight primary rays. Continuing with this example, six of the primary rays 12 are deflected by a first panel 14 (i.e. a shader) and two of the primary rays 12 are not deflected. The two primary rays not deflected by the first panel 14 are considered 'early misses' that will not be processed further by the threads. Six secondary rays 16 are spawning from the deflected primary rays 12. Considering that the eight threads are configured to treat all eight primary rays 12, the warp occupancy after the first panel 14 is only 75%. Out of the six secondary rays 16 deflected by the first panel 14, two more rays are not deflected by a second panel 18 while four remaining secondary rays 20 are deflected. The two secondary rays 16 not deflected by the second panel 18 are also 'early misses' that will not be processed by the threads. The warp occupancy is now reduced to 50%. The remaining four secondary rays 20 do reach a ray termination point 22, for example a camera, and may be processed by four threads. Although the eight threads are capable of treating eight rays, only half (50%) of their collective processing capability is actually used. The earlier the 'miss' of a ray, the earlier (and thus more severe) the waste of the processing capability of the thread allocated to that ray.

The scenario illustrated in FIG. 1 is equivalent to another scenario in which there would be no reflector between the original image 10 of the primary rays 12 and the ray termination point 22, some of the rays being blocked by various obstacles (or 'shaders'). Other scenarios may involve some of the primary rays reaching the ray termination point 22 substantially directly while some other primary rays are deflected and/or diffracted into secondary rays and take more time before actually reaching the ray termination point 22. Processing of these rays may require divergent (i.e. non-uniform) indirect function calls where threads within same warp might be calling entirely different functions.

In any case, these scenarios represent an inefficient use of the multiple thread capabilities of the GPU in the context of ray-tracing. Threads allocated to those rays that do not reach the ray termination point 22 may be inactive for a long time while other threads in a warp are bouncing and/or are diverted until they reach the ray termination point 22, at which point the warp terminates.

GPUs were originally designed for rapid imaging processing, such as for example for gaming applications, for the generation of special effects in movies and television programs, and the like. Regardless, some GPUs, particularly general-purpose GPUs (GPGPU), may be used for numerous other application types. The above-described limitations related to the inefficient utilization of GPU capabilities may be present when using GPUs in computer graphics applications as well as in other applications that benefit from its parallel processing capabilities.

Consequently, there is a need for techniques that better use the parallel processing capabilities of GPUs.

SUMMARY

An object of the present disclosure is to provide a method for parallel processing of tasks in a multiple thread computing system, comprising:

executing an instruction sequence of a thread allocated to a first task until the instruction sequence reaches an exit point of the instruction sequence;

terminating the execution of the instruction sequence of the thread for the first task at a convergence point of the instruction sequence; and selectively reallocating the thread to process a second task.

In at least one embodiment, the method further comprises defining the convergence point of the instruction sequence so that execution of the convergence point follows the exit point in the instruction sequence.

In at least one embodiment, the method further comprises transforming the instruction sequence by inserting task stealing code defining the convergence point as a post-dominator point following the exit point, wherein the task stealing code selectively reallocates the thread to process the second task.

In at least one embodiment, the method further comprises defining an epilogue containing a common instruction sub-sequence executable after the convergence point.

In at least one embodiment, the method further comprises defining the exit point of the instruction sequence by an end of a prologue containing a common instruction sub-sequence for execution for any task assigned to the thread.

In at least one embodiment, the instruction sequence is entirely executed for the second task if the second task does not exit at the exit point.

In at least one embodiment, the instruction sequence comprises a prologue defined from a start of the instruction sequence until the exit point, an epilogue defined for execution after the convergence point until an end of the instruction sequence, and a processing sub-sequence defined for execution between the exit point and the convergence point, the processing sequence being executed for a particular task that does not exit at the exit point.

In at least one embodiment, the thread is reallocated to process the second task if the cost of the processing sub-sequence is greater than a combined cost of the prologue and of the epilogue.

In at least one embodiment, the instruction sequence defines a loop, the exit point being included in the loop; executing the instruction sequence for the first task comprises a plurality of repetitions of instructions contained in the loop; and the thread is reallocated to the second task if a predetermined number of repetitions of the portion of the instructions contained in the loop is not exceeded before the first task exits at the exit point.

In at least one embodiment, the thread is one of a plurality of threads of the multiple thread computing system; and the first and second tasks are part of a plurality of tasks assigned for processing by the plurality of threads.

In at least one embodiment, the multiple thread computing system is used to mitigate early miss divergence in a ray-tracing application; each task of the plurality of tasks comprises processing a ray in the ray-tracing application; each given thread of the plurality of threads is initially assigned to processing a given primary ray; and for each given thread of the plurality of threads: if execution of the given primary ray does not exit at the exit point, the given thread is then assigned to process a secondary ray spawned from the given primary ray, and if execution of the given primary ray exits at the exit point, the given thread is then assigned to process another primary ray or another secondary ray.

In at least one embodiment, the method further comprises synchronizing the plurality of tasks at the convergence point of the instruction sequence.

In at least one embodiment, the instruction sequence is an inner instruction sequence nested within a program; the exit point of the instruction sequence is an inner exit point; the convergence point of the instruction sequence is an inner convergence point; and the program defines an outer instruction sequence having an outer exit point and an outer convergence point; the method further comprising executing the program for the first task by: executing the outer instruction sequence until the outer exit point, executing the inner instruction sequence if the first task does not exit at the outer exit point, and executing the outer instruction sequence starting from the outer convergence point.

In at least one embodiment, the method further comprises reallocating the thread to process the second task or a third task if the first task exits are the outer exit point; and reallocating the thread to the first task at the outer convergence point.

Another object of the present disclosure is to provide a non-transitory computer readable storage device on which is embedded computer software, the software comprising a program, the program performing a method for parallel processing of tasks in a multiple thread computing system, the method comprising:

detecting that execution of an instruction sequence of a thread allocated to a first task exits at an exit point of the instruction sequence;

terminating the execution of the instruction sequence of the thread for the first task at a convergence point of the instruction sequence; and selectively reallocating the thread to process a second task.

A further object of the present disclosure is to provide a multiple thread computing system, comprising:

an input device adapted to receive a plurality of tasks for execution by the multiple thread computing system; and a plurality of processors, each processor being operatively connected to the input device for receiving therefrom one or more of the plurality of tasks, each processor being assigned to execute one of a plurality of threads of the multiple computing system, each processor being programmed to:

executing an instruction sequence of a thread allocated to a first task until the instruction sequence reaches an exit point of the instruction sequence, terminate the execution of the instruction sequence of the thread for the first task at a convergence point of the instruction sequence, and selectively reallocate the thread to process a second task.

In at least one embodiment, the input device is adapted to receive the tasks in the form of rays from a sensor; and each processor is programmed to implement a ray-tracing procedure.

In at least one embodiment, the system further comprises a memory device operatively connected to the plurality of processors, the memory device storing the instruction sequence, the instruction sequence comprising a prologue defined from a start of the instruction sequence until the exit point, an epilogue executable after the convergence point until an end of the instruction sequence, and a processing sub-sequence defined for execution between the exit point and the convergence point, the processing sequence being executable for a particular task that does not exit at the exit point.

In at least one embodiment, the system further comprises a compiler adapted to: define the exit point of the instruction sequence by an end of a prologue containing a common instruction sub-sequence for execution for any task assigned to the thread; define the convergence point of the instruction sequence so that execution of the convergence point follows the exit point in the instruction sequence; transform the instruction sequence by inserting task stealing code defining the convergence point as a post-dominator point following the exit point, wherein the task stealing code selectively reallocates the thread to process the second task; and define an epilogue containing a common instruction sub-sequence executable after the convergence point.

BRIEF DESCRIPTION OF THE FIGURES

The features and advantages of the present disclosure will become apparent from the following detailed description, taken in combination with the appended drawings, in which:

FIGS. 2a, 2b and 2c collectively exemplify the identification of convergence points in a control flow code;

Figure 1:
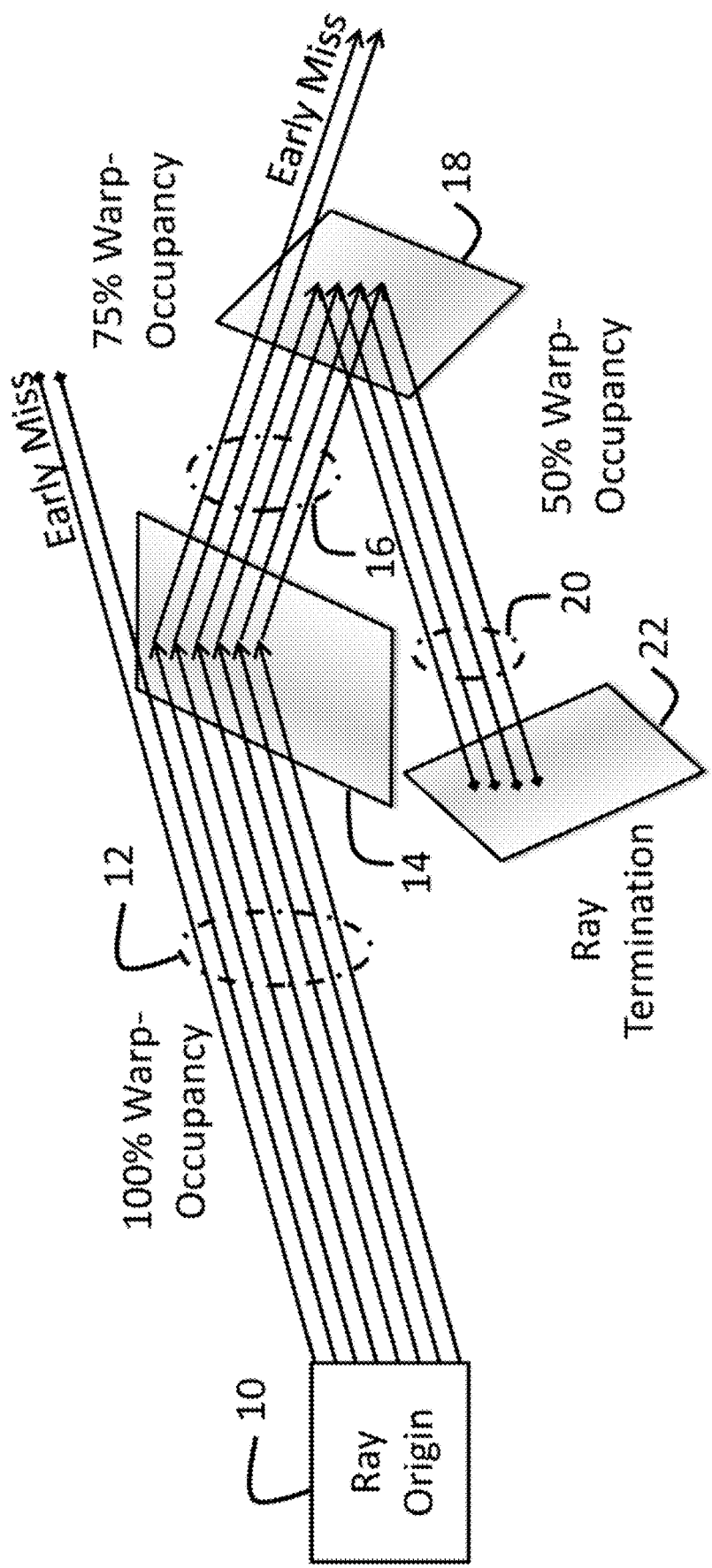
FIG. 1 (Prior Art) illustrates a ray-tracing scenario in which some rays from an origin miss a number of reflectors and stop being processed.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

Unless otherwise defined, all technical and scientific terms used herein have the same meaning as commonly understood by one of ordinary skill in the art to which the described embodiments appertain to.

Generally speaking, the present technology relates to parallel processing of tasks in a multiple thread computing system. A plurality of threads contain a same instruction sequence for a plurality of task instances (called 'tasks' for simplicity), each task involving processing of a respective set of task data. The processing of each task is in parallel with the other tasks, such that the tasks may be addressed concurrently, perhaps simultaneously. An 'exit point' is identified in the instruction sequence. The exit point is a point at which the instruction sequence may break, depending on the task data in a particular thread, following which more than one path may be taken by the thread, depending on the outcome of an operation defined at the exit point. For example, the thread may continue along different paths after an 'IF' statement, a 'FOR' statement, a 'WHILE' statement, a 'BREAK' statement, a 'GOTO' statement, and the like. A 'convergence point' is identified for the exit point. The convergence point is a particular point in the instruction sequence that the thread will reach no matter the path taken after the exit point. An epilogue is defined for each convergence point. The epilogue is a common instruction sub-sequence and contains one or more code instructions for execution of the thread following the convergence point, independently of the path taken by the thread after the exit point. A prologue is also defined for each exit point. The prologue is a common instruction sub-sequence, containing one or more code instructions, which are executed for any task assigned to the thread immediately before arriving at or reaching the exit point.

When a plurality of threads, i.e. a warp, are in operation, they are made to synchronize at the convergence point. Some of the threads may become inactive because the tasks that they are executing exit at an exit point and jump to the convergence point, where these tasks wait to be synchronized with other threads of the warp. Concurrently, other threads are continuing processing, taking a longer path before reaching the convergence point. In an embodiment of the present technology, these inactive threads may be allocated for processing other tasks. When the other tasks have been processed, the threads may be reallocated to their original tasks for resynchronization of the warp at the convergence points.

In an aspect of the present technology, a graphical processing unit (GPU) uses a single instruction multiple threads (SIMT) execution model. The SIMT model is implemented using a single instruction sequencer to operate on a group of threads, or warp, in lockstep. Use of the SIMT model amortizes instruction fetch and decode costs over a plurality of threads to improve efficiency. Implementation of the SIMT model uses a mechanism that allows threads to follow different control flow paths. In an embodiment, the GPU employ mechanisms that serialize the execution of divergent threads.

In another aspect of the present technology, the instruction sequence may comprise a plurality of exit points and a corresponding plurality of convergence points. It may be noted that two convergence points corresponding to two distinct exit points may coincide within the instruction sequence; otherwise stated, the two convergence points may effectively share the same position in the instruction sequence and may be at the start of the same epilogue.

In a further aspect of the present technology, a program may contain a plurality of nested instruction sequences, if of which may contain one or more exit points and corresponding convergence points.

In summary, using the present technology, the GPU brings the divergent threads to converge again at the convergence point, which is an immediate post-dominator of the instruction sequence, defined as the earliest point in a common instruction sub-sequence crossed by all diverged threads before the end of the instruction sequence.

Figures 2A, 2B, 2C:
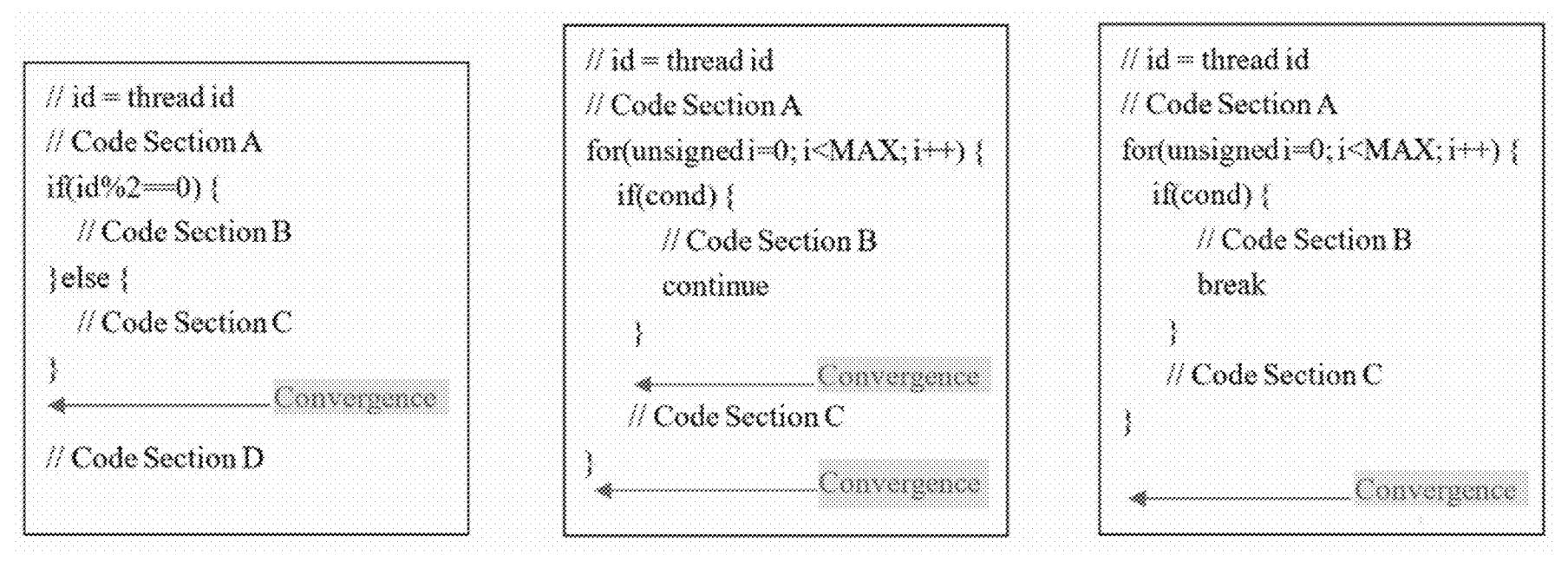

FIGS. 2a, 2b and 2c collectively exemplify the identification of convergence points in a control flow code. FIG. 2a shows a conventional if/else branch, in which threads diverge and take distinct paths at the if/else point, and then consistently converge at a point identified as 'Code Section D' before the program exists. Thus, the convergence point is at the start of 'Code Section D', which is the epilogue for the code depicted in FIG. 2a.

FIG. 2b shows a loop that contains a continue statement. There are two exit points in this loop, including (i) the exit of the loop defined by the FOR statement and (ii) the condition that leads to the CONTINUE statement. Each of the two resulting threads has its own convergence point. The CONTINUE statement leads the thread to a next iteration of the loop, thus the convergence point is just before executing the next iteration of the loop. On the other hand, the loop exit has its convergence point immediately following the loop exit. In the particular non-limiting example of FIG. 2b, it so happens that the two convergence points are at the same position in the instruction sequence.

FIG. 2c shows a loop that contains a break statement. Thus, the loop has two exit points, including the regular loop exit and the break exit. Both lead to convergence points that share the same position at the loop exit.

The present disclosure will provide examples of the present technology in the context of ray-tracing, because the single instruction multiple thread (SIMT) execution model is particularly useful in image processing applications. It should be understood, however, that the present technology is not so limited. In particular, graphical processing units (GPU) using the SIMT execution model may be effective in supporting other types of applications in which the workload of a thread is only known at run-time. In these applications, load imbalances may occur when some threads terminate their tasks earlier than others. Non-limiting examples of such applications comprise training of machine learning systems, navigation systems in aircrafts and in self-driving automobiles, and the like.

Figure 3A:
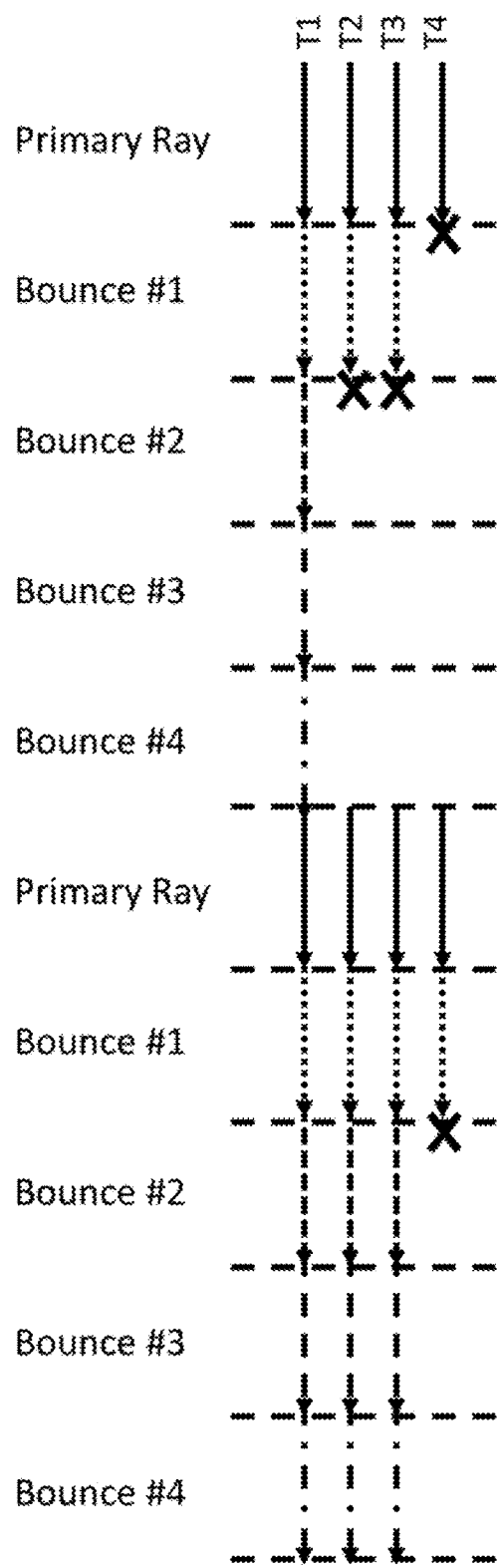
FIGS. 3a and 3b respectively illustrate a conventional allocation of threads to a number of rays and a dynamic allocation of threads to a number of rays according to an embodiment of the present technology.
Figure 3B:
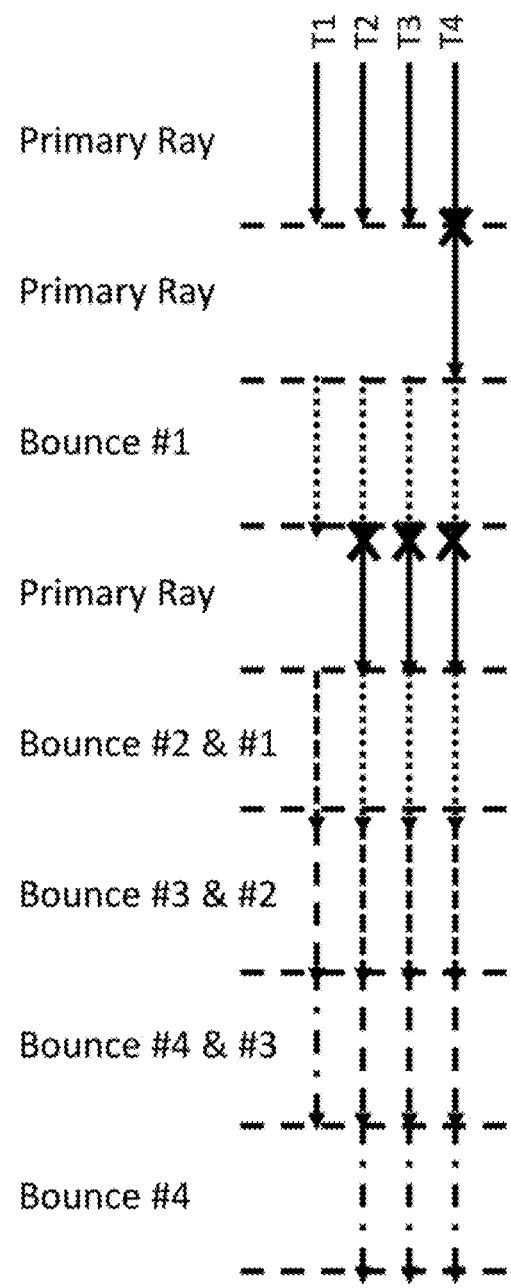

In the ray-tracing application of the SIMT execution model, early miss divergence is the most severe type of divergence because inactive threads stay inactive for a long time while other threads of the same warp continue being processed as respective rays go through various shaders that cause multiple bounces. In an aspect of the present technology, multiple rays may be traced by a same thread. When a particular thread is no longer used to trace a particular ray, it may be reallocated to trace another ray. In a non-limiting example, FIGS. 3a and 3b respectively illustrate a conventional allocation of threads to a number of rays and a dynamic allocation of threads to a number of rays. Both FIGS. 3a and 3b show two groups of four primary rays. Threads T1, T2, T3 and T4 are allocated to respective primary rays of the first and then second group of primary rays. In the first group of four primary rays, one primary ray has an early miss before a first bounce, and two secondary rays have early misses after the first bounce. In the second group of four rays, none of the primary rays has any early miss before the first bounce, and one secondary ray spawned from a respective primary ray has an early miss after the first bounce. Each early miss is identified by an 'X' positioned at a point where a corresponding ray disappears from FIGS. 3a and 3b.

FIG. 3a shows that, in the conventional allocation of threads, thread T4 becomes inactive when its corresponding primary ray of the first group has an early miss before the first bounce. Thread T4 thus no longer has any task to process at that time. The threads T2 and T3 becoming inactive after the first bounce of the corresponding secondary rays. Eventually, thread T1 continues with the processing of the respective secondary rays while the other threads are inactive. Thread T4 also becomes inactive when its corresponding secondary ray of the second group has an early miss after the first bounce, the other threads continuing their processing of their respective rays.

FIG. 3b shows that thread T4 may initially be allocated to a primary ray of the first group and be re-allocated to a primary ray of the second group after the early miss that precedes the first bounce of the first group of primary rays. Following this, all threads are thus allocated for processing secondary rays until after the first bounce. Three of the secondary rays have early misses after the first bounce, following which only the task assigned to thread T1 remains still need processing, while the tasks assigned threads T2, T3 and T4 terminate. Then, the primary rays of the second group that have not yet been allocated to any thread are allocated to threads T2, T3 and T4, which remain active for processing secondary rays spawning from these primary rays.

FIG. 3b shows that all threads are active for most of the time (in this particular scenario) so that the entire processing of the first and second groups of rays is executed in fewer operations when compared to the conventional allocation of threads of FIG. 3a. Although the actual number of processed tasks is the same as in FIG. 3a, the sequence is executed in eight operating cycles of the SIMT execution model, which compares with ten operating cycles in the case of FIG. 3a. This translate to a 20% reduction of the execution time in the particular example of FIGS. 3a and 3b. The following paragraphs will present techniques for allocating threads to various tasks in view of reducing the overall execution time when threads of the SIMT execution model would otherwise become inactive.

Figure 4A:
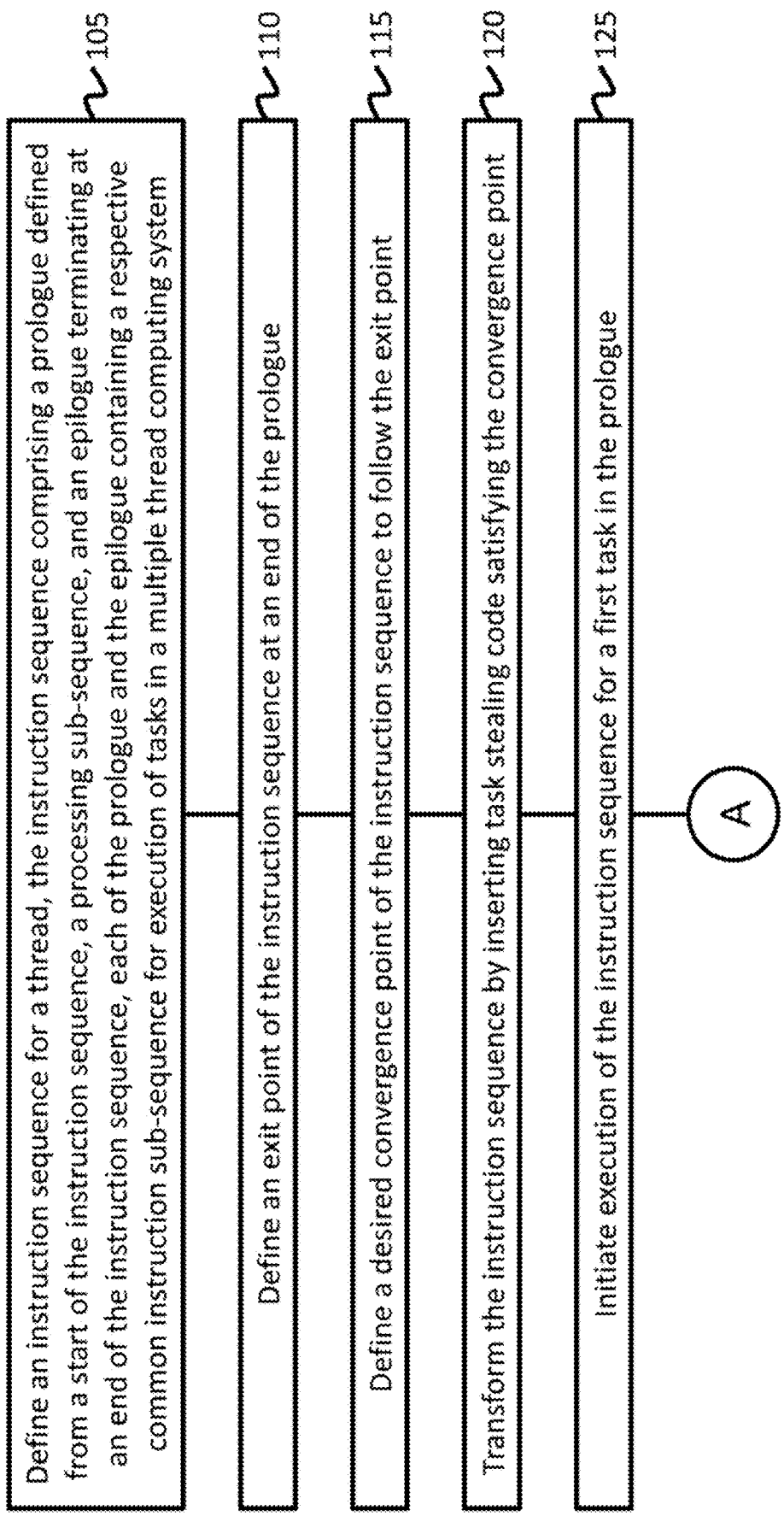
FIGS. 4a and 4b are a sequence diagram showing operations of a method for parallel processing of tasks in a multiple thread computing system according to an embodiment of the present technology.
Figure 4B:
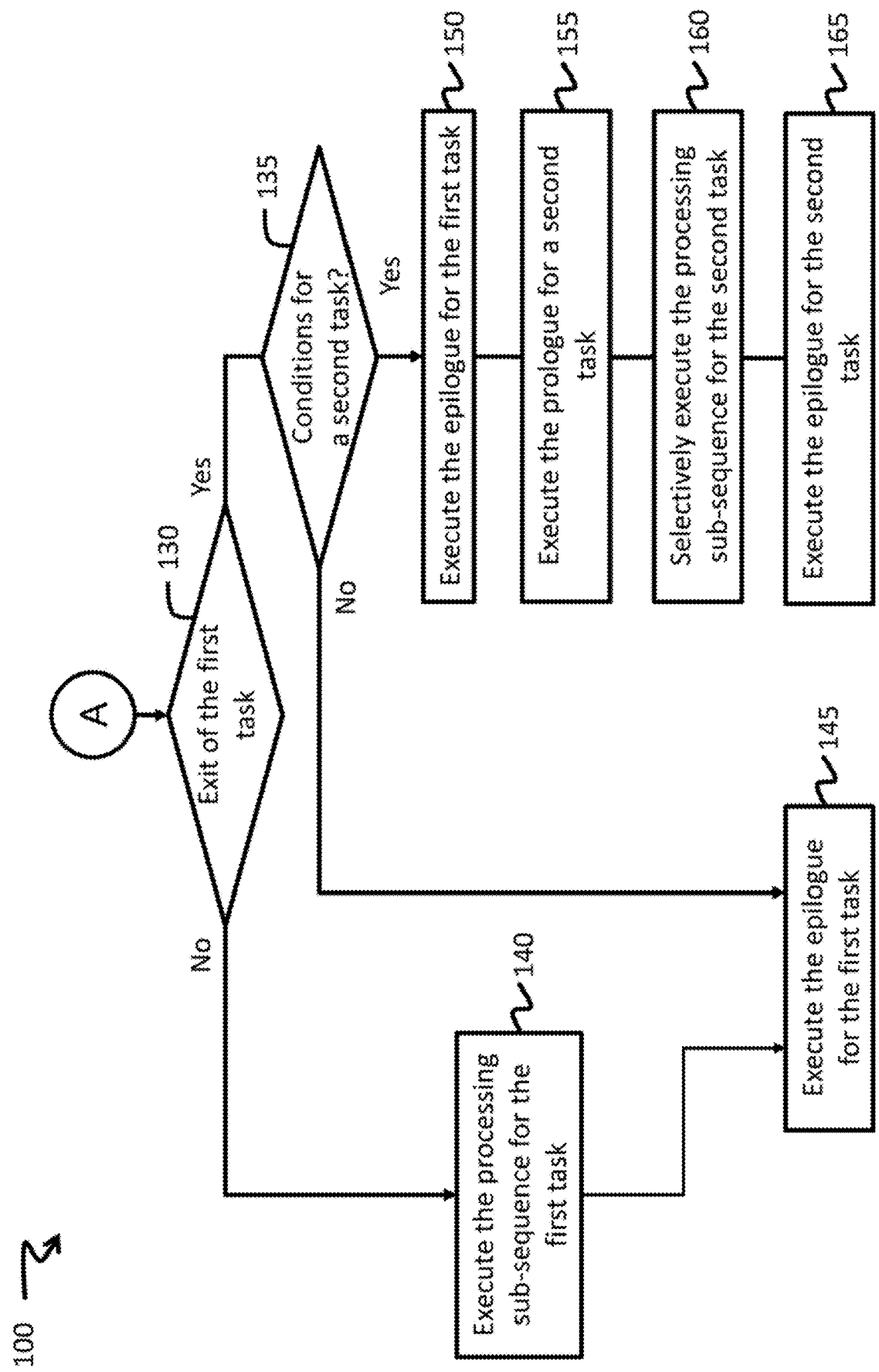

FIGS. 4a and 4b are a sequence diagram showing operations of a method for parallel processing of tasks in a multiple thread computing system. This system and its multiple processing threads may be employed, for example and without limitation, to mitigate early miss divergence in a ray-tracing application.

On FIGS. 4a and 4b, a sequence 100 comprises a plurality of operations, some of which may be executed in variable order, some of the operations possibly being executed concurrently, some of the operations being optional. At least some of the operations of the sequence 100 may be executed by a compiler that translates source code into binary code. As shown on FIG. 4a, operation 105 comprises defining an instruction sequence (i.e. executable code) for a thread. The instruction sequence comprises a prologue, a processing sub-sequence, and an epilogue. The prologue is defined from a start of the instruction sequence. The epilogue terminates at an end of the instruction sequence. Each of the prologue and the epilogue contain a respective common instruction sub-sequence for execution of tasks in a multiple thread computing system. In a particular example, the processing sub-sequence may comprise operations related to the treatment of a ray in the ray-tracing application. An exit point of the instruction sequence is defined at an end of the prologue at operation 110. A desired convergence point of the instruction sequence is defined at operation 115 to necessarily follow the exit point defined at operation 110.

At operation 120, the instruction sequence is transformed, for example by a compiler, by the insertion of task stealing code (i.e. additional executable code, discussed further below) satisfying the convergence point. The task stealing code is said to be 'satisfying' the convergence point because it forms a post-dominator point, for example and without limitation an immediate post-dominator point, of the instruction sequence, which is the earliest point crossed by all diverged threads before the end of the instruction sequence.

The thread being initially assigned to a first task by a task management function of the multiple thread computing system (i.e. a task manager), execution of the instruction sequence for the first task is initiated in the prologue at operation 125. The prologue terminates at the exit point defined in the instruction sequence. Continuing on FIG. 4*b*, operation 130 verifies whether the first task exits when it reaches the exit point. If the first task does not exit, the processing sub-sequence for the first task is executed at operation 140. For example and without limitation, in a ray-tracing application, operation 140 may comprise a complex sequence of operations for treating a ray. The epilogue for the first task is then executed at operation 145.

Considering operation 130, if the first task exits at the exit point, the task stealing code may selectively determine that the instruction sequence will be executed for a second task. Operation 135 verifies whether conditions for assigning the thread to the second task are satisfied. There may be no second task to be allocated to the thread, in which case the epilogue for the first task is executed at operation 145. Although a second task may be awaiting allocation to a thread, conditions present in the multiple thread computing system, some of which are described in the following paragraphs, may prevent allocating the thread to the second task. Also in that case, the epilogue for the first task is executed at operation 145.

If conditions for reallocating the thread to the second task are met at operation 135, the sequence continues by execution of the epilogue for the first task at operation 150. It may be noted that operations 145 and 150 may be the same, or may be equivalent, and may be implemented using the same executable code. Then the reallocation of the thread to the second task takes place by executing the prologue for the second task at operation 155. It may be noted that operations 125 and 155 are similar, although respectively executed for the first and second tasks.

Following operation 155, the processing sub-sequence is selectively executed for the second task at operation 160. The execution of operation 160 for the second task is substantially equivalent to the execution of operations 130, 135 and/or 140 for the first task, in the sense that the second task may also exit in the course of operation 160, with the possible reallocation of the thread to a third task. In all cases, the epilogue for the second task is executed at operation 165. Operation 160 may therefore be understood as incorporating the execution of operations 130 to 140 as applied to the second task. Design considerations of the multiple thread computing system may determine whether or not the thread initially assigned to the first task and then reallocated to the second task may be further reallocated to a third task.

It may be noted that if the first task does not exit at operation 130, the sequence 100 includes the execution of operations 140 and 145 for the first task. In contrast, if the first task exits at operation 130 and if the second task does not exit at operation 160, the sequence 100 will include the execution of operation 150 (for the first task) and operations 130, 135, 155, 160 and 165 (for the second task). As such, reallocation of the thread to the second task will increase the processing time of the thread. It may be desired to prevent delaying the thread by the handling of the second task, as excessive delays might impact the synchronization of the thread with other threads of the multiple thread computing system at operation 145 or 150 for the first task. Therefore, in an embodiment, the cost in terms of processing requirements to execute the prologue and/or the epilogue for the first task may be compared to the cost of executing the entire instruction sequence for the second task. The thread for the first task may be reallocated to process the second task if the cost of the processing sub-sequence is greater than a combined cost of the prologue and of the epilogue. The cost may also depend on how many threads are executing the sub-sequence (operation 140) verses how many threads are exiting. If a majority of threads are exiting, executing the prologue and the epilogue, and initiating new tasks for these threads may be deemed more favourable than continuing with just a few active threads. If the combined cost of the prologue (operation 125 or 155) and of the epilogue (operation 145, 150 or 165) is small in relation to the cost of the sub-sequence (operation 140), operation 160 (incorporating operations 130, 135 and/or 140) and 165 may be executed for the second task, in addition to executing operations 130, 135 and 145 for the first task, with a modest execution time increase when compared to a situation where the first task does not exit.

To illustrate with an example, if the prologue and the epilogue each have a cost of 1 and if the processing sub-sequence has a cost of 8, assuming a negligible cost of operations 130 and 135, executing operations 125, 140 and 145 for the first task amounts to a total cost of 10. Using the same cost numbers, executing operations 125 and 150 for the first task, and then executing operations 155, 160 (which incorporates operations 130, 135 and 140) and 165 for the second task amounts to a total cost of 12. In this particular example, the execution time increase is relatively modest, i.e. 20%. Although synchronization of the threads is somewhat delayed until execution of operation 165 for the second task, it will no longer be necessary to allocate a thread for the second task because it will already have been processed. Overall, it may be determined that a group of tasks including the first and second tasks will be executed more rapidly. Design considerations may determine a ratio of the cost of the processing sub-sequence over the combined cost of the prologue and epilogue sufficient to justify allocating the thread to a second task at operation 135.

In the same or another embodiment, the instruction sequence may define a loop, the exit point being included in the loop, the convergence point being outside of the loop. As such, executing the instruction sequence for the first task may comprise a plurality of repetitions of instructions contained in the loop. At operation 135, the thread initially assigned to the first task may be conditionally reallocated to the second task by determining whether a predetermined number of repetitions of the portion of the instructions contained in the loop is already exceeded before the first task exits at the exit point. For example and without limitation, if the loop defined in the instruction sequence comprises ten iterations and it the first task exits after eight iterations, the thread may not be reallocated to the second task at operation 135, as such reallocation might cause and excessive processing delay of the thread. Whether or not to reallocate the thread to the second task at operation 135 may also be understood as a notion of cost. If none or a few of the ten iterations have been executed, a modest execution time (i.e. cost) has already been spent processing the first task and the additional execution time (or cost) for processing the second task may be justified. Once again, design considerations may determine a maximum number of iterations of a loop having already been executed that may justify execution of operations 150 to 165.

According to the SIMT execution model, the thread introduced in the description of operation 105 may be one of a plurality of threads of the multiple thread computing system, and the first and second tasks may be part of a plurality of tasks assigned for processing by the plurality of threads. These tasks may be concurrently handled by the multiple thread computing system, being concurrent (wholly or partly overlapping in time), or being contemporary (being closely related in time). For example and without limitation, each task of the plurality of tasks may comprise processing a ray in a ray-tracing application. In this context, referring to FIGS. 3a and 3b, each given thread of the plurality of threads may initially be assigned to processing a given primary ray. As such, if execution of a given primary ray does not exit at the exit point (as determined at operation 130), the given thread may be assigned to process (at operation 160) a secondary ray spawned from the given primary ray. Otherwise, if execution of the given primary ray exits at the exit point, the given thread may be assigned at operation 135 to process another primary ray or another secondary ray at operation 160. In the example of FIG. 3b, the primary ray processed by thread T4 exits very early in the process and reallocation of T4 to another primary ray is amply justified. In another scenario (not shown) where thread T2 would exit after the third bounce, reallocation of T2 might to another primary ray might not be justified because the tasks handled by the group of threads are close to completion after the fourth bounce.

As a plurality of tasks, for example the processing of rays in the ray-tracing application, are handled by the multiple thread computing system, a task management function of the system may synchronize the plurality of tasks at the convergence point of the instruction sequence. Otherwise stated, the processing of each thread may be held as they reach the convergence point, at the beginning of operation 145 for the first task or at the beginning of operation 165 for the second task, and resume the processing when all of the threads have reached the convergence point.

Figure 5:
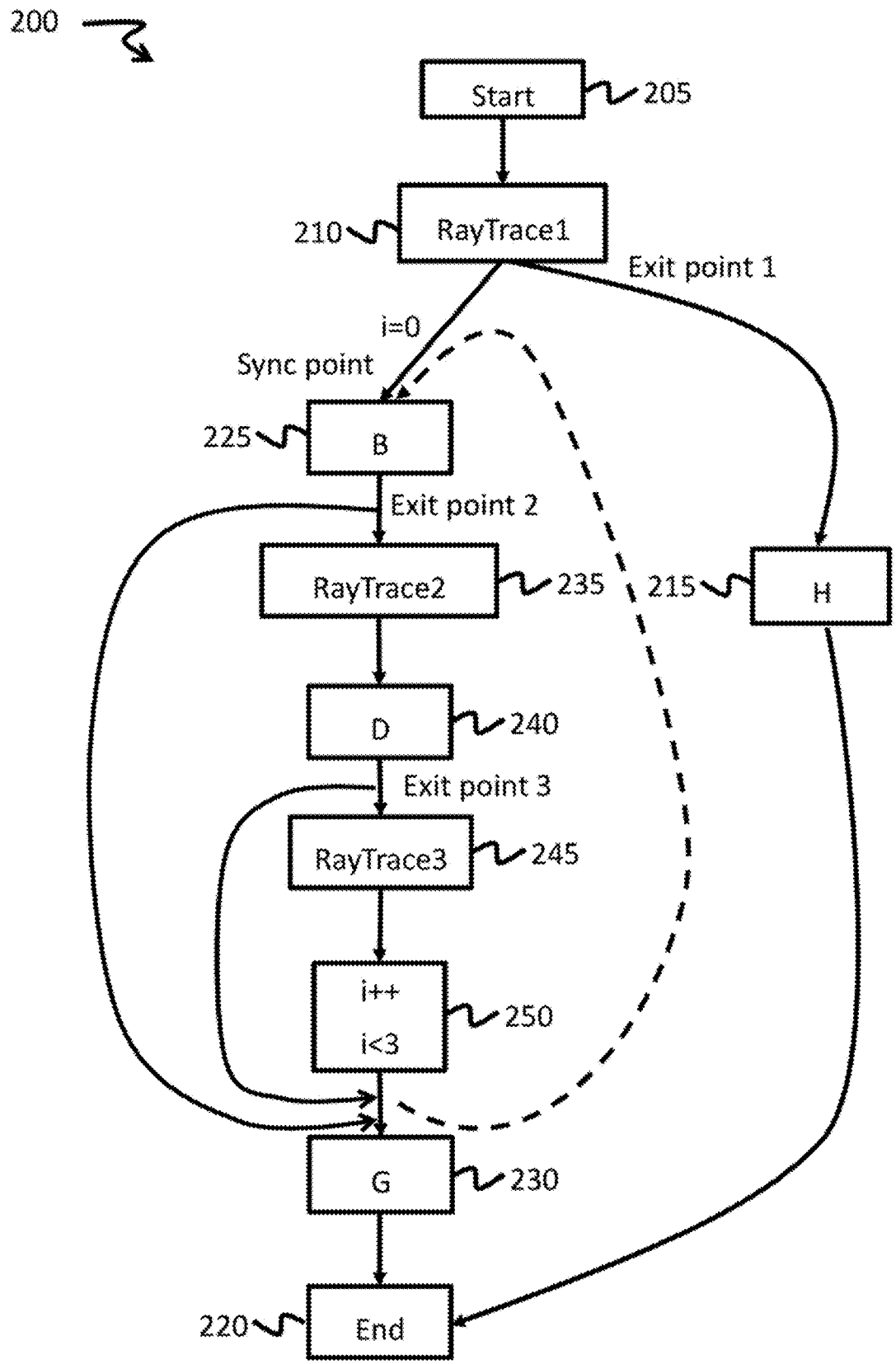
FIG. 5 is a flow chart of a program for a ray-tracing application, the program comprising nested instruction sequences according to an embodiment of the present technology.

FIG. 5 is a flow chart of a program for a ray-tracing application, the program comprising nested instruction sequences. FIG. 5 illustrates a program 200 prepared by a programmer. The program 200 is expected to be correctly written for performance of the ray-tracing application. However, the programmer was not mandated to support the operations of the sequence 100 for parallel processing of tasks in a multiple thread computing system. In other words, the programmer has not identified exit points, convergence points, prologues, epilogues or expensive code sub-sequences when preparing the program 200.

In the example of FIG. 5, the program 200 includes three ray-tracing procedures. The first ray-tracing procedure is part of an outer instruction sequence of the program 200 and the two other ray-tracing procedures are part of inner instruction sequences nested within the program 200. After a start 205 of the program 200, a first ray-tracing procedure 210 is executed for a given task that, in the example of FIG. 5, relates to a primary ray. The first ray-tracing procedure 210 is part of a common path of the program 200, so the first ray-tracing procedure 210 is always executed. The program 200 may end after the first ray-tracing procedure 210, implying that no further ray-tracing procedure will be applied to this task. In this example, no secondary ray is spawned from the primary ray. For this primary ray that requires no further ray-tracing procedure, execution of the program 200 continues at a building block H 215 (the building block being a sequence of code), and the program 200 ends at 220.

If processing does not end after first ray-tracing procedure 210, processing of the program 200 continues with a first inner instruction sequence. The first inner instruction sequence may be applied to a secondary ray spawning from the primary ray processed by the first ray-tracing procedure 210. As the remainder of the program 200 forms a loop, a counter 'i' for the loop is set to zero. Then, the first inner instruction sequence begins with a building block B 225. The building block B 225 contains instructions that are always executed when in this first inner instruction sequence. If processing of the ray ends after execution of the instructions contained in the building block B 225, no further ray-tracing procedure will be applied to the ray. For this ray requiring no further ray-tracing procedure after building block B, processing continues at a building block G 230.

If processing of the ray does not end after the building block B 225, processing of the ray continues with a second inner instruction sequence that includes a second ray-tracing procedure 235, which is followed by another building block D 240. The building block D 240 contains instructions that are always executed when in the second inner instruction sequence. If processing of the ray ends after execution of the instructions contained in the building block D 240, no further ray-tracing procedure will be applied to the ray. For this ray having no further ray-tracing procedure after building bock D, processing continues at building block G 230.

If processing of the ray does not end after the building block D 240, processing of the ray continues with a third ray-tracing procedure 245. Then at operation 250, the loop counter 'i' is incremented and a verification is made that a maximum number of iterations of the loop is not exceeded should be less than 3 in the non-limiting example of FIG. 5). Operation 250 may have two distinct outcomes. If the maximum number of iterations is not exceeded, execution of the program 200 returns to a start of the building block B 225. If the maximum number of iterations is met at operation 230, the program 200 continues at the building block G 230. Regardless of the path taken within the program 200, when the program 200 ends at 220 after execution of instructions contained in the building block G 230.

The program 200 may therefore implement a thread for treating a primary ray and for treating secondary rays spawning from the primary ray. Consideration of FIG. 5 and of its description reveal that the program 200 may end after various exit points, identified as exit points 1, 2 and 3 on FIG. 5. Additionally, provided that the program 200 does not exit at the first exit point (exit point 1), it may exit after zero or more complete iterations defined between the building block B225 and the verification made at operation 250. Considering the exit point after the first ray-tracing procedure 210 and considering that up to three iterations of the loop may each break at two distinct exit points, after the building block B 225 and after the building block D 240, the program 200 may terminate at any one of seven dynamically defined exit points.

In an embodiment of the present technology, a compiler may identify these exit points within the program and attempt to locate a common convergence point. The compiler identifies a convergence point (i.e. sync point) at the start of the building block B 225. In order to make the building block B 225 a convergence point for the first exit point (exit point 1), the compiler may reorganize the code for the program 200 so that execution of the building block H 215 is followed by execution of the building block B 225. The compiler may modify the program 200 so that exits at the exit point 2 and/or at the exit point 3 lead to the execution of operation 250, rather than leading to the building block G 230, so that the loop counter may be verified. If the maximum count has not been reached, execution of the program 200 may return to the convergence point at the start of the building block B. The building block B 225 thus becomes the epilogue that follows this convergence point.

The compiler may insert ray stealing code in the program 200 to allow, under certain conditions, reallocating the thread implemented by the program 200 to another task, for example for treating a new primary ray, if the program 200 exits early, i.e. before the maximum number of iterations verified at operation 250. In the particular case of ray-tracing applications, each ray-tracing procedure 210, 235 and 245 may imply execution of a large number of expensive instructions. Consequently, some threads may complete the execution of their tasks much earlier than others, depending on a number of times ray-tracing procedures are executed. A task manager allocating the various tasks (e.g. rays) within the multiple thread computing system may use the ray stealing code to consider the extent of the processing performed by the program 200 before it exits and determine whether or not to reallocate a new task to the thread. Considering a plurality of threads that are each implemented by instances of the program 200, the task manager may prioritize the allocation of new tasks to the earliest exiting threads, for example to threads exiting after the first ray-tracing procedure 210 or after a first iteration of the loop.

Figure 6:
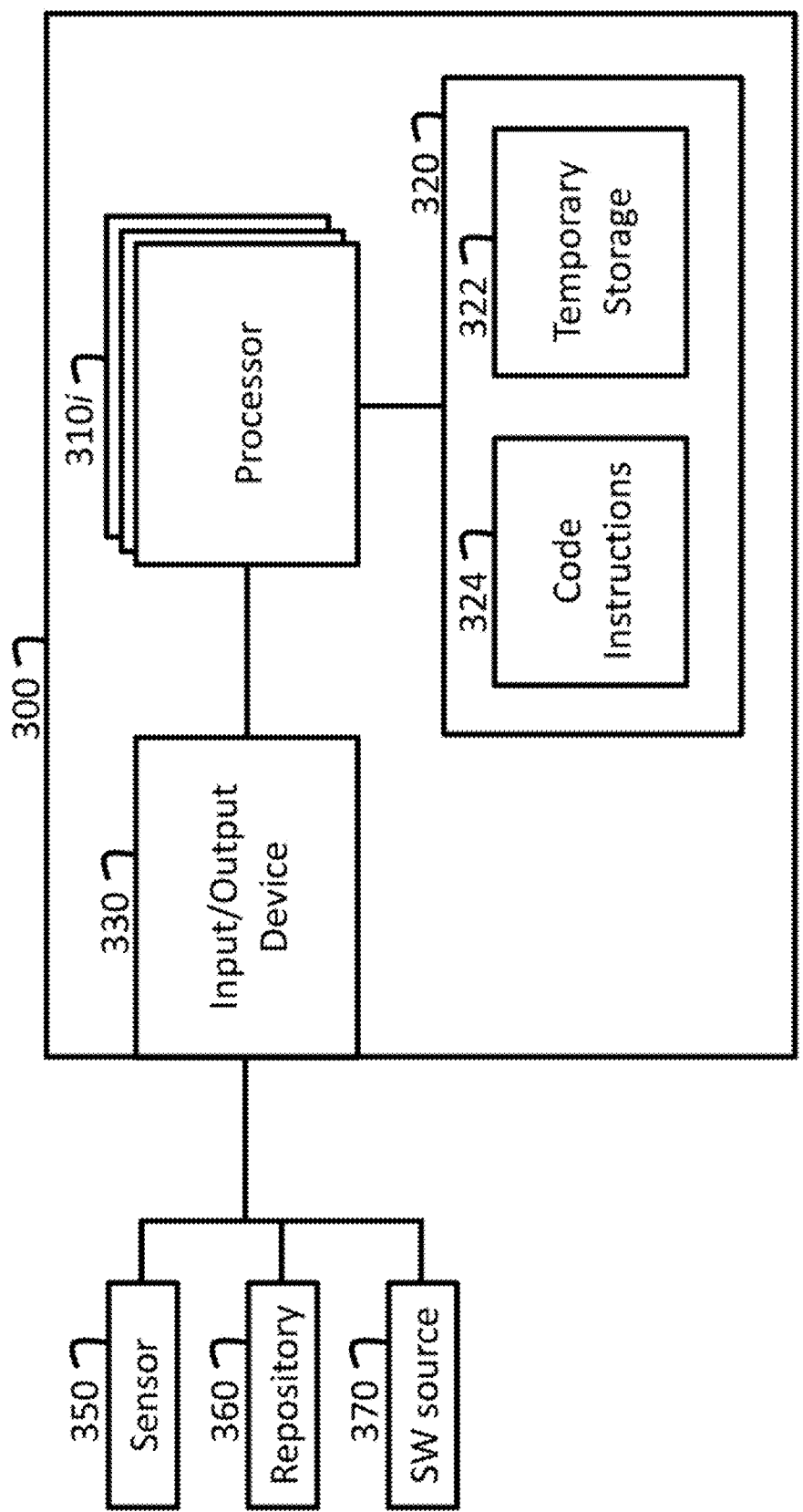
FIG. 6 is a simplified block diagram of a multiple thread computing system according to an embodiment of the present technology.

FIG. 6 is a simplified block diagram of a multiple thread computing system. A multiple thread computing system 300 comprises a plurality of processors 310$i$, each of which may implement a copy of the program 200 and may support a respective thread assign to process a respective task. In an embodiment, each of the processors 310$i$ may actually comprise a plurality of cooperating processors. In the same or another embodiment, each processor 310$i$ may be a GPU core. The system 300 also comprises a memory device or a plurality of memory devices (represented as a single memory device 320 for simplicity), an input/output device or a plurality of input/output devices (represented as an input/output device 330 for simplicity). Separate input and output devices may be present instead of the input/output device 330. When used in ray-tracing applications, the input/output device 330 may be adapted to communicate with an image sensor 350, for example a camera, for receiving information about rays collected by the image sensor 350, and with a repository 360 storing results of the ray-tracing application. Equivalently, the input/output device 330 may be adapted to communicate with other sources of tasks and to other recipients of its analyses. The input/out device 330 may further be adapted to communicate with a software source 370 for receiving software such as the program 200, instruction sequences, identification of exit points and convergence points within instruction sequences, and the like. The memory device 320 may comprise a temporary storage 324 for storing data which may include, for example, temporary results from ray-tracing procedures or from other results obtained by execution of other instruction sequences.

The processors 310$i$ are operatively connected to the memory device 320 and to the input/output device 330. The memory device 320 may comprise a non-transitory computer-readable medium 322 for storing code instructions that are executable by the processor 310$i$ to perform the operations of the sequence 100 and of the program 200.

Various embodiments of the method and system for parallel processing of tasks in multiple thread computing, as disclosed herein, may be envisioned. Some of these embodiments may implement a systematic methodology to mitigate early miss divergence in ray-tracing applications. In an aspect of the present technology, a programmer may develop instruction sequences, for example those of the program 200, and identity the exit points and convergence points that allow a multi ray-tracing system to avoid the early miss divergence problem. In another aspect, a compiler may receive the program 200 and automatically identify these exit points and convergence points. As expressed earlier, the identification of the exit points and convergence points inherently allows to define the prologues, which end at the exit points, and the epilogues, which begin at the convergence points.

Figure 7:
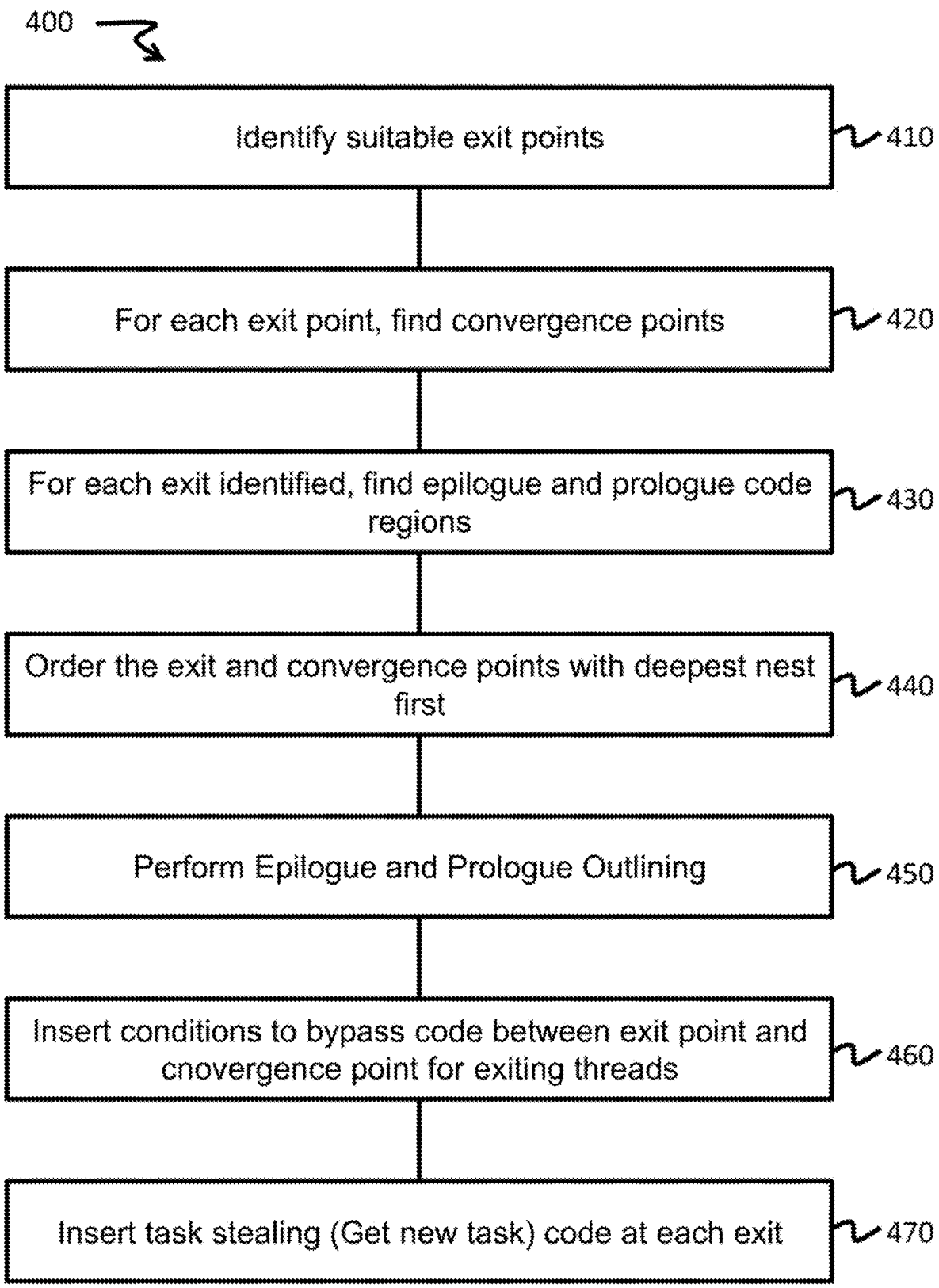
FIG. 7 is a sequence diagram showing operations of a method adapting a program for parallel processing of tasks in a multiple thread computing system according to an embodiment of the present technology.

FIG. 7 is a sequence diagram showing operations of a method adapting a program for parallel processing of tasks in a multiple thread computing system. On FIG. 7, a sequence 400 comprises a plurality of operations, some of which may be executed in variable order, some of the operations possibly being executed concurrently, some of the operations being optional. Initially, a program such as the program 200 has been prepared developed in a conventional manner, for example by a programmer, without particular attention to the early miss divergence problem. At that time, no identification has yet been made of any exit point or convergence point in the instructions of the program 200.

Operation 410 comprises the identification of suitable exit points in the program 200. This identification may be performed, for example, considering the location of expensive operations within the program 200, for example ray-tracing procedures, in particular when the execution of these expensive operations is conditional to the outcome of statements such as IF, FOR, WHILE, BREAK, and GOTO statements. Exit points may also be defined in relation to the start and the end of a loop within the program 200. In some embodiments, operation 410 may be equivalent to operation 110 of FIG. 4a.

A convergence point is identified at operation 420 for each of the exit points identified at operation 410. Convergence points may be identified by considering the location of ELSE statements that follow IF statements, considering the end of any loop, or considering addresses designated by GOTO statements. Some embodiments of operation 420 may be equivalent to operation 115 of FIG. 4a. Epilogues and prologues may be identified at operation 430. As expressed hereinabove, the epilogue is a code region that is consistently executed after exit of a task and the prologue is a code region that is consistently executed when a task is initialized.

When the program contains a plurality of nested instruction sequences, as in the case of the program 200, the exit and convergence points may be ordered starting from a deepest of the nests defined in the program at operation 440. The epilogues and prologues may be outlined as function calls at operation 450 in order to save code duplication. Conditions for bypassing code of a processing sequence located between each exit point and its corresponding convergence point are defined at operation 460. Such conditions, which may be used to determine whether a thread is reallocated to a new task if the task exits, may include for example considerations related to a cost of various instruction sub-sequences and/or to a number of already executed iterations in a loop. Code defined for acquiring a new task when a task exits while conditions are proper is inserted at each exit at operation 470. This code may be described as a 'task stealing code' in the sense that a thread assigned to a first task may be reallocated to a second task. In an embodiment, the task stealing code may be persistent and continue assigning yet another task if the newly assign task reaches an early exit. In another embodiment, the task stealing code may be opportunistic and stop attempting to assign further tasks if the new task exits early. In some embodiments, operation 470 may be equivalent to operation 120 of FIG. 4*a*.

It will be understood that, when considering FIG. 7 and its description, each mention of a 'task' may be replaced with a mention of a 'ray', when the program is part of a ray-tracing application.

Figure 8A:
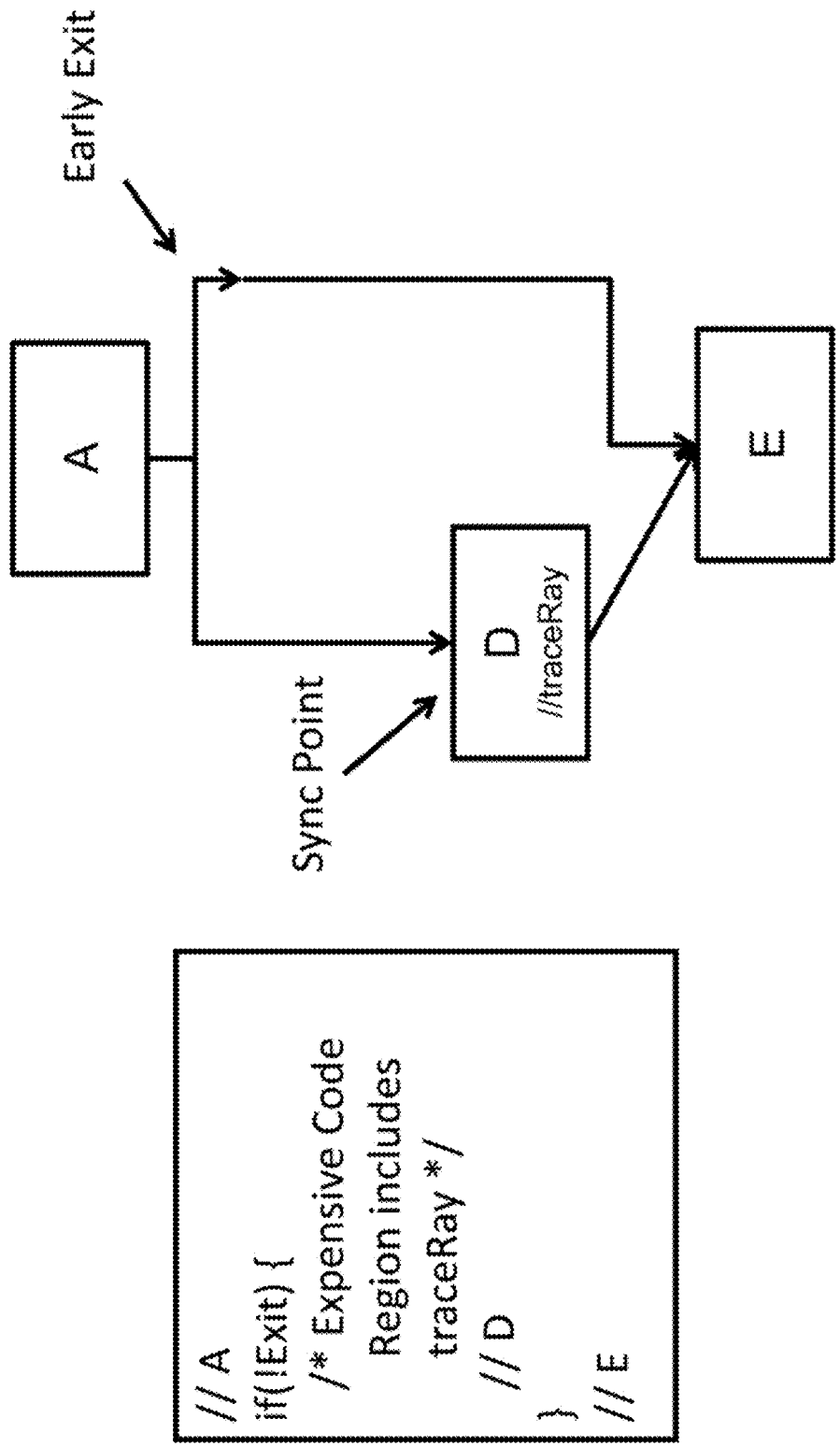
FIG. 8a is a first example of a code sequence containing an expensive sub-routine for a ray-tracing application.
Figure 8B:
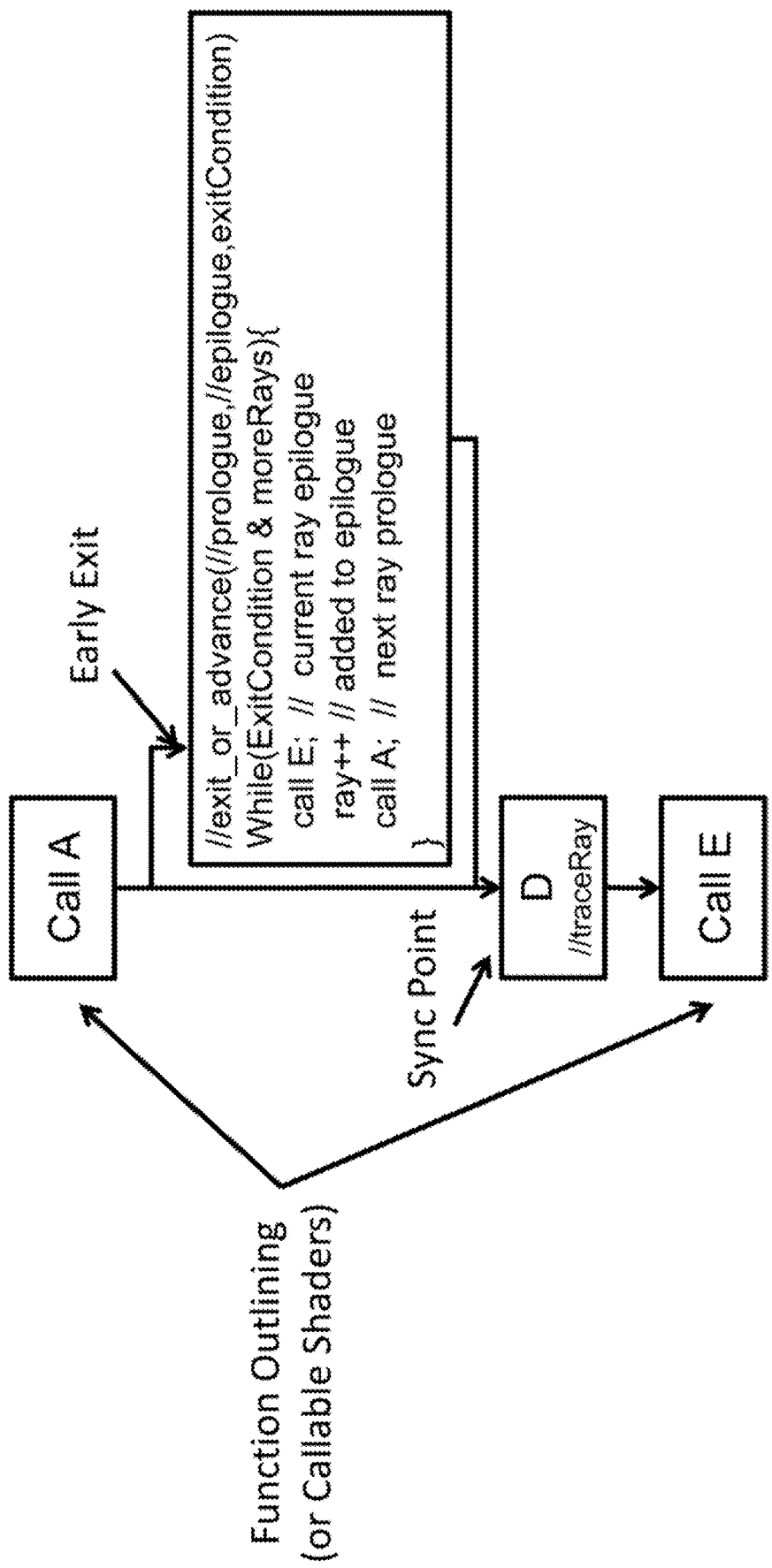
FIG. 8b illustrates an example of a persistent task stealing code modifying the code sequence of FIG. 8a according to an embodiment of the present technology.

FIG. 8*a* is a first example of a code sequence containing an expensive sub-routine for a ray-tracing application. The code sequence is represented on the left-hand side of FIG. 8*a* and a structure of the code sequence identifying an early exit point and a convergence point (sync point) is represented on the right-hand side of FIG. 8*a*. Block A represents a prologue that precedes an expensive code sequence D for the ray-tracing application. Block E represents an epilogue that follows the expensive code sequence D, or directly follows block A in case of early exit. FIG. 8*b* illustrates an example of a persistent task stealing code modifying the code sequence of FIG. 8*a* according to an embodiment of the present technology. The prologue A and the epilogue B are now implemented as function calls. Thread stealing code (i.e. ray stealing code in this ray-tracing application) is inserted between the early exit point and the convergence (sync) point for conditionally allocating another task (i.e. another ray) to the thread.

Figure 9A:
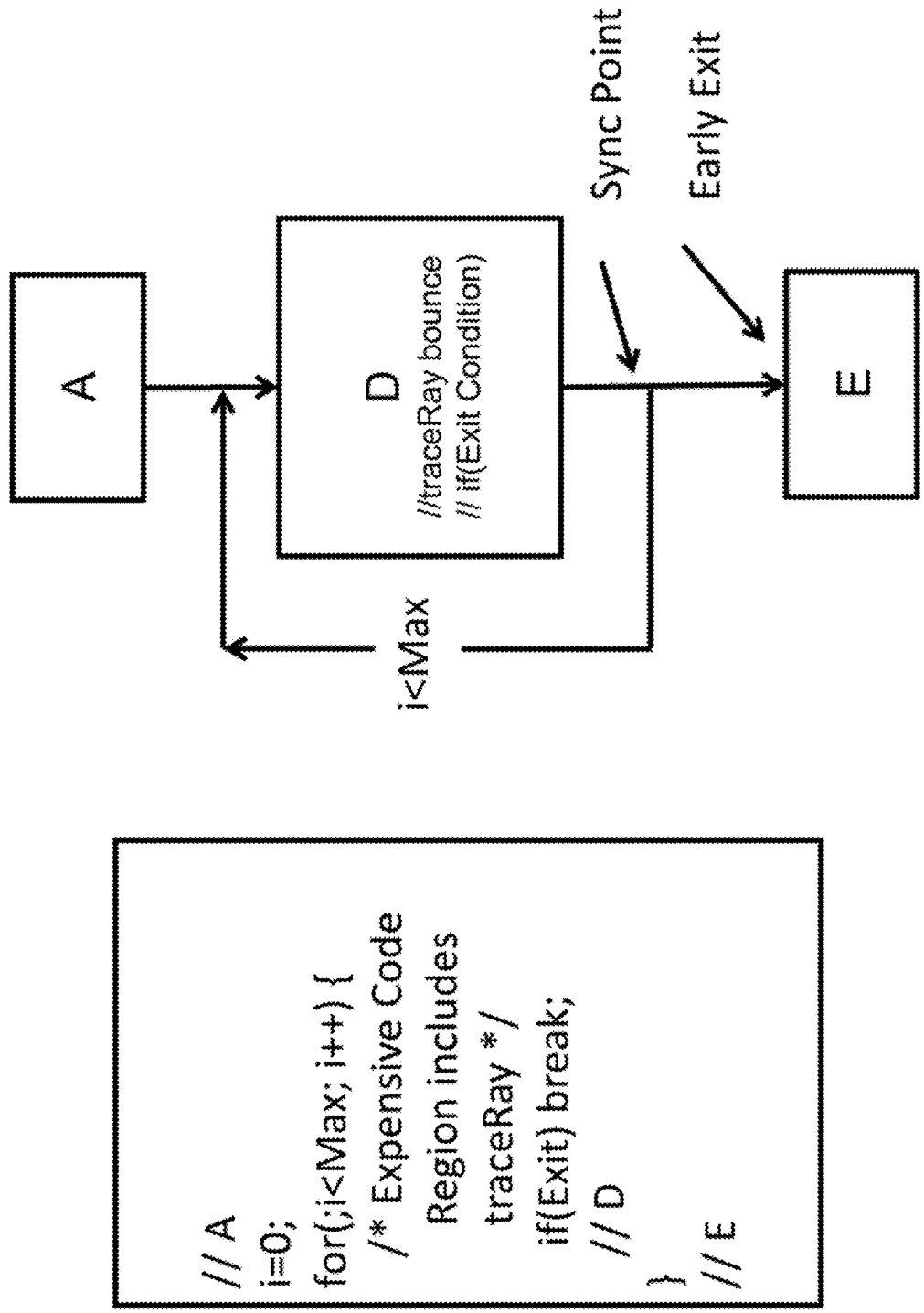
FIG. 9a is a second example of a code sequence containing an expensive sub-routine for a ray-tracing application.
Figure 9B:
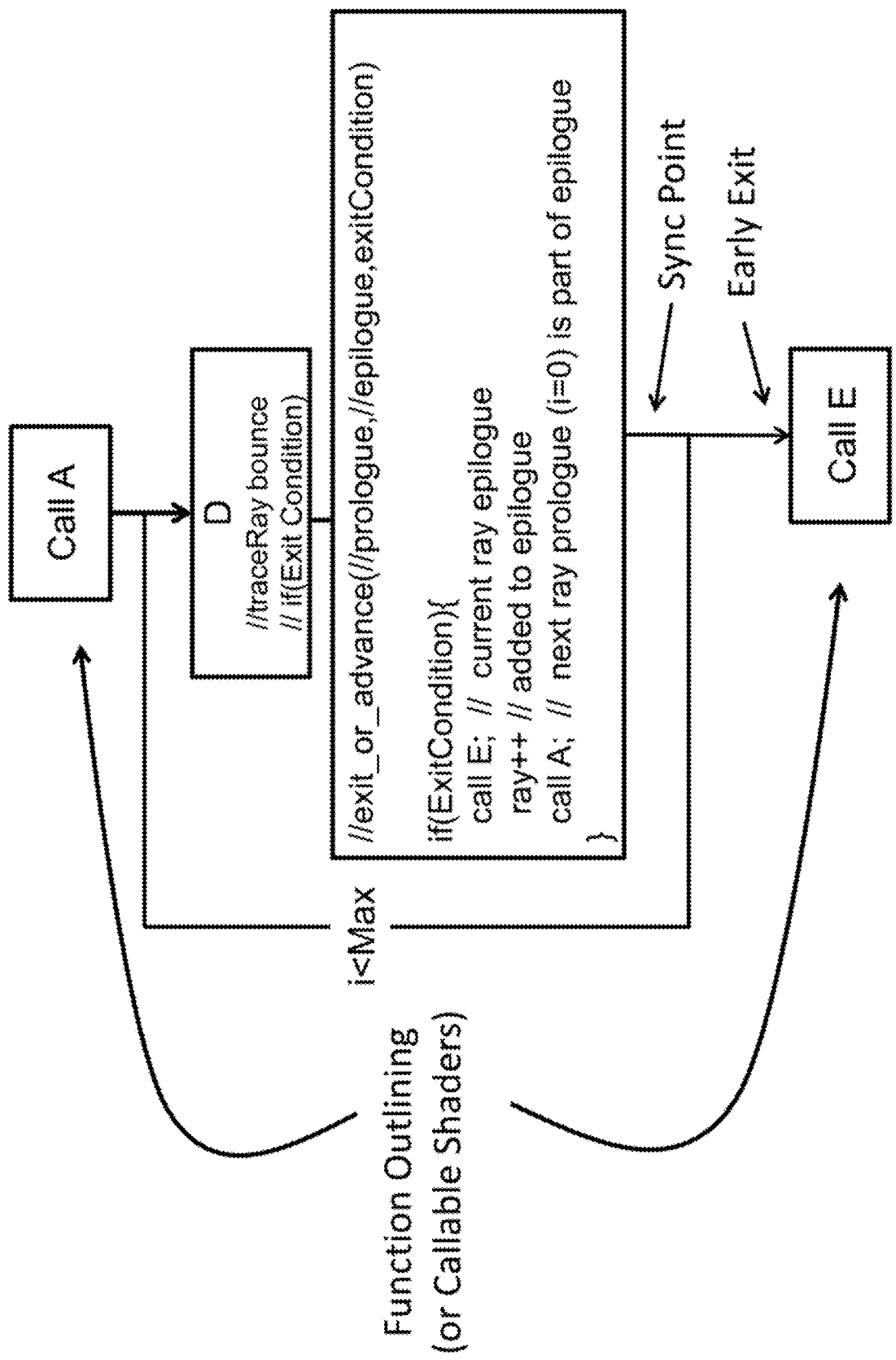
FIG. 9b illustrates an example of an opportunistic task stealing code modifying the code sequence of FIG. 9a according to an embodiment of the present technology.

FIG. 9*a* is a second example of a code sequence containing an expensive sub-routine for a ray-tracing application. The code sequence of FIG. 9*a* mainly differs from that of FIG. 8*a* in that the expensive code sequence D is contained in a loop. FIG. 9*b* illustrates an example of an opportunistic task stealing code modifying the code sequence of FIG. 9*a* according to an embodiment of the present technology. Thread stealing code is inserted within the loop of FIG. 9*b*.

The examples presented in FIGS. 8*a*, 8*b*, 9*a* and 9*b* are specific to ray-tracing applications and are not intended to be limiting. Pseudo-code contained in these Figures is self-explanatory.

It will be appreciated that the operations of the sequences 100 and 400 may be performed by computer programs, which may exist in a variety of forms both active and inactive. Such as, the computer programs may exist as software program(s) comprised of program instructions in source code, object code, executable code or other formats. Any of the above may be embodied on a computer readable medium, which include storage devices and signals, in compressed or uncompressed form. Representative computer readable storage devices include conventional computer system RAM (random access memory), ROM (read only memory), EPROM (erasable, programmable ROM), EEPROM (electrically erasable, programmable ROM), and magnetic or optical disks or tapes. Representative computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general.

It is to be understood that the operations and functionality of the described method, constituent components, and associated processes may be achieved by any one or more of hardware-based, software-based, and firmware-based elements. Such operational alternatives do not, in any way, limit the scope of the present disclosure. Further, as discussed herein, the operations and functionality of these components may be improved by, among other things, more economical, expedient, and practical use of tangible machine resources.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A method for parallel processing a plurality of tasks in a multiple thread computing system directed to mitigating early exit divergence in a single instruction multiple thread (SIMT) execution model, in which each of the plurality of tasks includes processing a respective ray and each thread of the plurality of threads is assigned to processing a primary ray, the method comprising:
   executing an instruction sequence for each thread from the multiple threads that is allocated to a respective first task from the plurality of tasks until the instruction sequence reaches an exit point of the instruction sequence;
   terminating the execution of the instruction sequence of each thread for the respective first tasks at a convergence point of the instruction sequence; and
   selectively reallocating the thread to process a respective second task from the plurality of tasks,
   wherein for each thread of the plurality of threads:
      if execution of the respective primary ray does not exit at the exit point, the corresponding thread is then assigned to process a secondary ray spawned from the respective primary ray, and
      if execution of the respective primary ray exits at the exit point, the corresponding thread is then assigned to process another primary ray or another secondary ray.

2. The method of claim 1, further comprising defining the convergence point of the instruction sequence so that execution of the convergence point follows the exit point in the instruction sequence.

3. The method of claim 2, further comprising transforming the instruction sequence by an inserting task stealing code defining the convergence point as a post-dominator point following the exit point, wherein the task stealing code selectively reallocates the thread to process the second task.

4. The method of claim 1, further comprising defining an epilogue containing a common instruction sub-sequence executable after the convergence point.

5. The method of claim 1, further comprising defining the exit point of the instruction sequence by an end of a prologue containing a common instruction sub-sequence for execution for any task assigned to the thread.

6. The method of claim 1, wherein the instruction sequence is entirely executed for the second task if the second task does not exit at the exit point.

7. The method of claim 1, wherein the instruction sequence comprises a prologue defined from a start of the instruction sequence until the exit point, an epilogue defined for execution after the convergence point until an end of the instruction sequence, and a processing sub-sequence defined for execution between the exit point and the convergence point, the processing sequence being executed for a particular task that does not exit at the exit point.

8. The method of claim 7, wherein the thread is reallocated to process the second task if the cost of the processing sub-sequence is greater than a combined cost of the prologue and of the epilogue.

9. The method of claim 1, wherein:
the instruction sequence defines a loop, the exit point being included in the loop;
executing the instruction sequence for the first task comprises a plurality of repetitions of instructions contained in the loop; and
the thread is reallocated to the second task if a predetermined number of repetitions of the portion of the instructions contained in the loop is not exceeded before the first task exits at the exit point.

10. The method of claim 1, further comprising synchronizing the plurality of tasks at the convergence point of the instruction sequence.

11. The method of claim 1, wherein:
the instruction sequence is an inner instruction sequence nested within a program;
the exit point of the instruction sequence is an inner exit point;
the convergence point of the instruction sequence is an inner convergence point; and
the program defines an outer instruction sequence having an outer exit point and an outer convergence point;
the method further comprising executing the program for the first task by:
executing the outer instruction sequence until the outer exit point,
executing the inner instruction sequence if the first task does not exit at the outer exit point, and
executing the outer instruction sequence starting from the outer convergence point.

12. The method of claim 11, further comprising:
reallocating the thread to process the second task or a third task if the first task exits are the outer exit point; and
reallocating the thread to the first task at the outer convergence point.

13. The method of claim 1, wherein:
the instruction sequence is an inner instruction sequence nested within a program;
the exit point of the instruction sequence is an inner exit point;
the convergence point of the instruction sequence is an inner convergence point; and
the program defines an outer instruction sequence having an outer exit point and an outer convergence point;
the method further comprising executing the program for the first task by:
executing the outer instruction sequence until the outer exit point,
executing the inner instruction sequence if the first task does not exit at the outer exit point, and
executing the outer instruction sequence starting from the outer convergence point.

14. The method of claim 11, further comprising:
reallocating the thread to process the second task or a third task if the first task exits are the outer exit point; and
reallocating the thread to the first task at the outer convergence point.

15. A non-transitory computer readable storage device on which is embedded computer software, the software comprising a program, the program performing a method for parallel processing of a plurality of tasks in a multiple thread computing system directed to mitigating early exit divergence in a single instruction multiple thread (SIMT) execution model, in which each of the plurality of tasks includes processing a respective ray and each thread of the plurality of threads is assigned to processing a primary ray, the method comprising:
executing an instruction sequence for each thread from the multiple threads that is allocated to a respective first task from the plurality of tasks until the instruction sequence reaches an exit point of the instruction sequence;
terminating the execution of the instruction sequence of each thread for the respective first tasks at a convergence point of the instruction sequence; and
selectively reallocating the thread to process a respective second task from the plurality of tasks,
wherein for each thread of the plurality of threads:
if execution of the respective primary ray does not exit at the exit point, the corresponding thread is then assigned to process a secondary ray spawned from the respective primary ray, and
if execution of the respective primary ray exits at the exit point, the corresponding thread is then assigned to process another primary ray or another secondary ray.

16. A multiple thread computing system for parallel processing a plurality of tasks directed to mitigating early exit divergence in a single instruction multiple thread (SIMT) execution model in which each of the plurality of tasks includes processing a respective ray and each thread of the multiple threads is assigned to processing a primary ray, the multiple thread computing system comprising:
an input device adapted to receive the plurality of tasks for processing by the multiple thread computing system; and
a plurality of processors, each processor being operatively connected to the input device for receiving therefrom one or more of the plurality of tasks, each processor being assigned to execute one of a plurality of threads of the multiple computing system, in which each processor is configured to:
execute an instruction sequence for each thread from the multiple threads that is allocated to a respective first task from the plurality of tasks until the instruction sequence reaches an exit point of the instruction sequence,
terminate the execution of the instruction sequence of each thread for the respective first tasks at a convergence point of the instruction sequence; and,
selectively reallocate the thread to process a respective second task from the plurality of tasks,
wherein for each thread of the plurality of threads:
if execution of the respective primary ray does not exit at the exit point, the corresponding thread is then assigned to process a secondary ray spawned from the respective primary ray, and
if execution of the respective primary ray exits at the exit point, the corresponding thread is then assigned to process another primary ray or another secondary ray.

17. The system of claim 16, further comprising a memory device operatively connected to the plurality of processors, the memory device storing the instruction sequence, the instruction sequence comprising a prologue defined from a start of the instruction sequence until the exit point, an epilogue executable after the convergence point until an end of the instruction sequence, and a processing sub-sequence defined for execution between the exit point and the convergence point, the processing sequence being executable for a particular task that does not exit at the exit point.

18. The system of claim 16, further comprising a compiler adapted to:
- define the exit point of the instruction sequence by an end of a prologue containing a common instruction subsequence for execution for any task assigned to the thread;
- define the convergence point of the instruction sequence so that execution of the convergence point follows the exit point in the instruction sequence;
- transform the instruction sequence by inserting task stealing code defining the convergence point as a post-dominator point following the exit point, wherein the task stealing code selectively reallocates the thread to process the second task; and
- define an epilogue containing a common instruction subsequence executable after the convergence point.

* * * * *